United States Patent [19]
Dorpfeld et al.

[11] Patent Number: 5,554,685
[45] Date of Patent: Sep. 10, 1996

[54] METHOD OF MAKING A SIGN HAVING RAISED CHARACTERS

[75] Inventors: Wayne L. Dorpfeld, Oakfield; Robert W. Williams, Akron; Arnold R. Wolfe, Medina, all of N.Y.

[73] Assignee: American Tactile Corporation, Medina, N.Y.

[21] Appl. No.: 540,838

[22] Filed: Oct. 11, 1995

Related U.S. Application Data

[62] Division of Ser. No. 993,870, Dec. 23, 1992, Pat. No. 5,504,144.

[51] Int. Cl.⁶ .............................. C08L 83/07; B44C 1/165
[52] U.S. Cl. ........................ 524/588; 156/230; 264/162; 264/236
[58] Field of Search .............................. 156/230; 524/588

[56] References Cited

U.S. PATENT DOCUMENTS

| | | | |
|---|---|---|---|
| 3,853,660 | 12/1974 | Peters et al. | 156/230 |
| 5,207,851 | 5/1993 | Abrams | 156/230 |
| 5,250,133 | 10/1993 | Kawamura et al. | 156/240 |
| 5,288,358 | 2/1994 | Logan | 156/268 |
| 5,316,608 | 5/1994 | Ocampo et al. | 156/230 |
| 5,383,996 | 1/1995 | Dressler | 156/234 |
| 5,413,839 | 5/1995 | Chatwin et al. | 428/195 |
| 5,441,785 | 8/1995 | Liebe, Jr. | 428/41 |
| 5,483,321 | 1/1996 | Cahill et al. | 355/200 |

Primary Examiner—Melvyn I. Marquis
Assistant Examiner—Karen A. Dean
Attorney, Agent, or Firm—Jaeckle, Fleischmann & Mugel

[57] ABSTRACT

The invention is a composition of matter used in the making of raised characters for use in signs, and a method of manufacturing raised characters made from the composition. The matter is a polymerizable composition comprising a silicone rubber compound, and about 10 to about 50 weight percent of a silica filler based on the weight of the polymerizable composition. Moreover, the composition of matter is a curable composition comprising a vinyl resin selected from a vinyl plastisol or vinyl organosol, and about 10 to about 50 weight percent of a silica filler based on the weight of curable composition. The invention also includes a method of manufacturing raised characters for use in signs comprising machining the characters from a partially cured polymerizable material. A further method is disclosed for manufacturing raised characters for use in signs, comprising partially curing a liquid polymerizable or curable composition in a form having a relatively uniform thickness, and, machining the characters from the partially cured composition. Finally, a method for making signs using the raised characters of the invention is disclosed.

5 Claims, 3 Drawing Sheets

METHOD OF MAKING A SIGN HAVING RAISED CHARACTERS

This application is a division of application Ser. No. 07/993,870 filed Dec. 23, 1992 which application is now U.S. Pat. No. 5,504,144.

BACKGROUND OF THE INVENTION

The invention relates generally to a composition of matter for raised characters and a method for manufacturing raised characters for use in making signs.

The Americans with Disabilities Act, hailed as the most far-reaching civil rights legislation in recent history, was signed into law in 1990, with portions of the law taking effect in 1992, 1993 and 1994. In a nutshell, the law requires businesses which serve the public to remove barriers and become more accessible to the disabled. Signage guidelines require facilities to be accessible to the blind and visually impaired.

Businesses affected by the law include shopping malls, health-care providers, banks, movie theaters, museums, libraries, schools, health clubs, restaurants, airports, hotels and other public accommodations.

An important part of the law mandates the use of Braille and raised character signs. Under the guidelines, signs designating handicapped parking spaces, passenger loading zones and van accessible spaces must be in Braille. Handicapped accessible entrances also must have Braille signs, as must those leading into public transportation facilities such as bus stations or airports.

Interior signs such as room numbers and names, identification of places within the building, directional and informational signs must be in Braille and raised characters. Elevators must also have Braille and raised lettering.

Quite simply, the Americans with Disabilities Act has created a niche in the signage industry which did not previously exist. In particular, with respect to the Braille and raised character requirements, the law requires:

Raised and Brailled Characters and Pictorial Symbol Signs (Pictograms)
Letters and numerals shall be raised $\frac{1}{32}$ in, upper case sans serif or simple serif type and shall be accompanied with Grade 2 Braille. Raised characters shall be at least $\frac{5}{8}$ in (16 mm) high, but no higher than 2 in (50 mm). Pictograms shall be accompanied by the equivalent verbal description placed directly below the pictogram. The border dimension of the pictogram shall be 6 in (152 mm) minimum in height.
Federal Register/Vol. 56, No. 144/Friday, Jul. 26, 1991, Section 4.30.4 at page 35659.

Presently, there are three general methods for manufacturing raised letters for use in making signs. In one method, a computer-directed X-Y router is used to cut the letters. The material to be cut is laid flat on a bed, and the words of the sign are programmed into a computer. The programming accommodates size, style and spacing of the characters. The characters are then individually cut by the router. After cutting, the whole words are transferred to a sign face, where excess material is removed from about the periphery of the characters. Typically, chips of cut material must be cleaned from the characters.

The disadvantages of this first method are several. First, the X-Y routers are very expensive, typically in the range of approximately $17,000 to $30,000, depending on model size and manufacturer. This price makes these machines unaffordable by many small sign shops. Another disadvantage with this method is that the cleanup of the characters after cutting (i.e., chip removal) is tedious and very time-consuming. The routing machine itself is very noisy to operate, which is especially troublesome in a small shop. Finally, this method limits the spacing between characters, since space must be allowed for the router bit to travel. In other words, it is difficult and/or impossible to produce whole words with very little spacing between individual letters. Another similar method to routing is X-Y computer driven laser cutters which are also very expensive, create gaseous discharges and are extremely dangerous.

A second method of manufacturing raised characters is injection molding. This is an extremely expensive method, with tooling costs for each mold in the range of $3,000 to $4,000 for just one letter size. In addition, injection mold machines typically cost between $15,000 to $20,000 each. Again, this expense is generally beyond the means of small sign shops. A further disadvantage of this method is that the molded letters are individually placed, aligned and adhered to the sign. Alignment by eye and hand is a tedious process.

Yet a third method is that of manufacturing die-cut letters. Again, the cost of steel dies to machine the letters are prohibitively expensive. As with injection molding, the die-cut method is limited to producing letters only in the sizes for which dies are available. Finally, die-cut letters must be placed on signs one letter at a time, which is very time consuming.

Thus, it is seen that a need exists for a new method of manufacturing raised characters for use in signs, which characters preferably meet the requirements of the Americans With Disabilities Act. The new method should be inexpensive and simple to implement, and should preferably use existing equipment found in most small to medium size sign shops.

BRIEF SUMMARY OF THE INVENTION

The present invention broadly comprises a polymerizable composition comprising a silicone rubber compound, a catalytic amount of a catalyst for curing the silicone rubber compound, and about 10 to about 50 percent by weight of a silica filler based on the weight of polymerizable composition, which composition is used in the making of raised characters for use in signs.

The present invention further comprises a curable vinyl resin composition comprising a polyvinyl chloride resin selected from a vinyl plastisol or vinyl organosol, a catalytic amount of a catalyst for curing the vinyl resin, and about 10 to about 50 percent by weight of a metal carbonate or metal sulfate filler based on the weight of curable vinyl resin composition.

The invention also includes a method of manufacturing raised characters for use in signs comprising machining the characters from a partially cured polymerizable or curable material. A further method is disclosed for manufacturing raised characters for use in signs, comprising partially curing a liquid polymerizable or curable composition in a form having a relatively uniform thickness, and, machining the characters from the partially cured composition. Yet another method of making a sign having raised characters is disclosed comprising machining the characters from a partially cured polymerizable or curable composition, removing unwanted material from the composition, leaving the characters intact, curing the machined characters, and, transferring the machined characters to the sign.

A general object of the invention is to provide a composition of matter and a method for manufacturing raised characters for use in making signs.

A further object of the invention is to provide a composition of matter which is initially soft enough that characters may be machined therefrom by standard inexpensive cutters found in most small sign shops, wherein the characters may be subsequently cured to an acceptable hardness by the sign shop proprietor.

Another object of the invention is to provide a method of making signs having raised characters.

These and further features, objects and advantages of the invention will become apparent to those skilled in the art from the following detailed description and appended drawings.

DETAILED DESCRIPTION OF THE INVENTION

A. The Composition of Matter

Polymeric Materials

Figure 1:
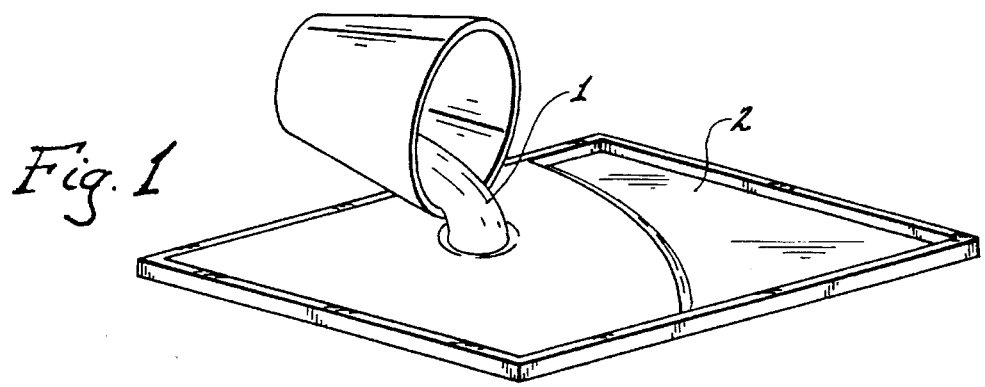
FIG. 1 illustrates the liquid uncured polymerizable or curable composition being poured into a platen.

The polymeric materials used in the practice of the invention include any suitable curable or polymerizable polymeric materials. Such polymers are any polymers which are machinable and soft prior to being cured and which are hard subsequent to being cured. Examples of suitable resins include certain vinyl resins, modified alkyds, allyl diglycol carbonates, diallylisophthalates, diallylphthalates, unsaturated polyesters, polyimides, silicones, and silicone polyimides. Particularly suitable polymeric materials include silicone rubber compounds and vinyl resins such as plastisols and organosols. "Curable or Polymerizable" as used herein means curable or polymerizable by heat radiation or any other suitable means to a Shore A hardness of 80 or more. "Machinable" as used herein means that material can be selectively removed by any suitable machine including laser machining. Preferred machining includes cutting and routing.

Silicone rubber compounds

The silicone rubber compounds are members of the family of synthetic polymers which are partly organic and partly inorganic, which are described in the Modern Plastics Encyclopedia, October 1977, Volume 54, Number 10A at pages 104 to 107, the disclosure of which is incorporated herein by reference. The silicone rubber compounds are also described in the Kirk-Othmer Encyclopedia of Chemical Technology, Second Edition, Volume 18, pages 228 to 230, the disclosure of which is incorporated herein by reference.

Preferred silicone rubber compounds are disclosed in a Technical Bulletin published by Wacker Silicones Composition on Aug. 18, 1992, the disclosure of which is incorporated herein by reference.

Other preferred silicone rubber compounds are disclosed in a bulletin entitled "Technical Information Silastic® GP-50 Silicone Rubber" published in June 1989, the disclosure of which is incorporated herein by reference.

Generally, catalytic amounts of suitable catalysts are employed in the reaction to cure the silicone rubber compounds. Generally, the catalysts can be used in the range of about 0.5 to about 15 parts per 100 parts of silicone rubber compound. Preferred catalysts for the curing of such silicone rubber compounds and preferred compositions are 1.2 parts of 2,4 dichlorobenzoyl peroxide per 100 parts by weight of silicone rubber compound and 0.8 parts of 2,5 di(t-butylperoxy) 2,3 dimethyl hexane.

Vinyl Resins

Vinyl resins or compounds suitable for use in the practice of the invention include vinyl plastisols and vinyl organosols. Vinyl plastisols are dispersions of fine particle size polyvinyl chloride resins in plasticizing liquids. The polyvinyl chloride resins preferably have an inherent viscosity of about 0.5 to about 1.5. In addition to the resins and plasticizers, heat or light stabilizers, color pigments, flame retardants, blowing agents, or many other additives can be included as determined by the intended product. Suitable stabilizers include metallic soaps or salts such as calcium/zinc salts. Suitable plasticizers can include phthalate ester plasticizers, adipates and trimellatates. The resins can also include a polymerizable monomer such as an acrylic monomer. Such a monomer can further cure the product. Plastisols are fused with heat in relatively thick sections without concern for solvent or water blistering; they are commonly referred to as 100% solids material.

Vinyl organosols are closely related to plastisols. Simply stated, they are plastisols to which a volatile solvent or thinner has been added. Their utility arises from being able to use a liquid to apply a hard, tough film in thickness, generally limited to under 15 mils.

Plastisols and organosols are dispersions of vinyl resins in a plasticizer. They are also referred to as dispersion resins, and are disclosed in the Kirk-Othmer Encyclopedia of Chemical Technology, Second Addition, Volume 21, pages 403–404, the disclosure of which is incorporated herein by reference.

Preferred plastisols and organosols are disclosed in a brochure entitled: Innovations in Plastisols, published in 1991 by PLAST•O•MERIC, Incorporated, the disclosure of which is incorporated herein by reference.

Plastisols are liquid at room temperature. Depending on the compound, they can be poured, calendered, pumped, sprayed, knife-coated or cast to a desired thickness. As plastisol is heated, fusion takes place and it is converted into a tough, homogeneous mass with excellent abrasion, aging, corrosion, and electrical resistance.

Fusion requirements for vinyl plastisols and vinyl organosols vary from compound to compound. Minimum fusion temperature is the temperature at which ultimate physical properties are obtained. It is necessary to bring the entire mass of plastisol or organosol and adjacent surfaces up to that temperature. The minimum fusion temperature of plastisol or organosol is approximately 350° F. Lower temperature fusion plastisols are available.

At room temperature, plasticizers have little or no solvating effect on the vinyl resins. As the temperature of the plastisol is raised, a dissolving action progresses. At an intermediate temperature (generally 140° to 200° F.), enough solvation occurs for the plastisol or organosol to solidify or gel. At this stage, the vinyl resin has a gelatinous to flexible consistency. As the temperature increases, solvation continues until the mass becomes more or less homogeneous (fusion).

A monomer compound such as the acrylic monomer can assist the curing reaction especially during the second stage or postcuring step.

Generally, catalytic amounts of suitable catalysts are employed in the reaction to cure the vinyl resin composition. Generally the catalysts are employed in the range of about 0.01 to about 0.5 percent by weight of the total curable resin composition (including additives). Preferred catalysts are peroxide compounds, preferably organic peroxides.

Filler Compounds

Various filler compounds can be employed in the practice of the invention.

The preferred fillers for the silicone rubber compounds are silica compounds. Especially preferred fillers include ground silica and silicon carbonate.

Especially preferred fillers for the vinyl compositions are metal carbonates or metal sulfates such as calcium carbonate, barium sulfate, calcium sulfate, talc and clay.

Other fillers useful in the invention include Kaolin clays, magnesium carbonates, hydrated alumina, magnesium oxide, magnesium carbonate, fumed silica precipitated hydrated silicas, ground talc, organic reactive extenders, and the like. Such fillers are disclosed in Plastics Technology, 1992/93 Manufacturing Handbook & Buyers Guide, the disclosure of which is incorporated herein by reference.

The fillers for the silicone rubber compounds are generally employed in a proportion of about 10 to about 50 percent by weight of filler based on the weight of the polymeric composition, including additives. The filler is employed particularly in the proportion of about 15 to about 40 percent by weight of filler and more particularly in the proportion of about 20 to about 30 percent by weight of filler based on the weight of polymeric material including additives.

The fillers for the vinyl resins are generally employed in a proportion of about 10 to about 50 percent by weight of filler based on the weight of vinyl resin composition including additives. Such fillers are employed particularly on the proportion of about 15 to about 40 percent by weight of filler based on the weight of vinyl resin composition including additives, and still more particular in a proportion of about 20 to about 30 percent by weight.

The polymeric compositions of the invention are first polymerized or precured at a temperature of about 250° to about 300° F. to a composition having a Shore A Durometer (e.g. A scale) rating of about 40 to about 80. This material can be provided as films in rolls or sheets for use in subsequent processing operations as will be described hereinafter.

The precured materials can be postcured or further hardened during or following subsequent operations. For example, the precured materials of the invention can be postcured by subjecting to elevated temperatures or UV light to ultimately provide postcured materials having a hardness of a Shore A Durometer rating of at least 80 to 100, usually about 90.

The following examples serve to illustrate the invention, but not to limit it. Parts are by weight and temperatures in degrees Fahrenheit.

EXAMPLE 1

The following components are blended in the proportions indicated, all proportions being given by weight.

| | |
|---|---|
| Polyvinyl Chloride Resin (inherent viscosity 1.15–1.25) | 35–40% |
| Phthalate Ester Plasticizers | 13–18% |
| Calcium Carbonate (mean particle size 5 microns) | 20–25% |
| Epoxidized Soybean Oil | 0.5–1% |
| Acrylic Monomer (molecular weight 300–350) | 20–25% |
| Organic Peroxide Catalyst | 0.01–0.2% |
| Inhibitor | 0–0.1% |
| Calcium/Zinc/Phosphite Stabilizer | 0.5–1.5% |
| Titanium Dioxide Colorant (Rutile Grade) | 1–5% |

The components are mixed and then heated at temperatures in the range of about 250° to 300° F. The resulting material is cast to a flexible sheet having a Shore A Durometer rating of 67.

The resulting product is postcured to a semi-rigid material having a Shore A Durometer rating of 90–100.

EXAMPLE 2

The following components are blended in the proportions indicated; all proportions being given by weight.

| Component | Parts by Weight |
|---|---|
| Methyl Vinyl Silicone Rubber (manufactured by Dow Corning STI) | 100 |
| 2,4-Dichlorobenzoyl Peroxide | 10 |
| 5 micron particle size ground silica filler | 25 |

The foregoing components are mixed in a mixing vessel at ambient temperature and calendered to a film having a Shore A Durometer rating of about 40.

The resulting sheet is postcured to a product having a Shore A Durometer rating of about 90.

EXAMPLE 3

The following components are blended in the proportions indicated, all proportions being given by weight.

| Component | Parts by Weight |
|---|---|
| Silicone Rubber Compound sold commercially under the designation C1018 by Wacker silicones Corporation | 100 |
| 2,4-Dichlorobenzoyl Peroxide | 1.2 |
| 5 micron particle size ground silica filler | 35 |

The resulting composition is cured to a thin film having a Shore A Durometer rating of about 95.

B. The Method of Manufacturing Raised Characters

It is to be understood that the word "character" as used throughout this patent is intended to refer to letters, numerals, symbols, graphics, and the like which are used on signs to improve readability and/or understanding, especially by the visually impaired.

Adverting now to the drawings, FIG. 1 illustrates the first step in the method of the invention. A liquid polymerizable or curable material 1 is poured into flat platen 2 to a predetermined uniform thickness. For example, the thickness may be 1/32 inch. Although the liquid is shown being poured from a bucket, in practice, the liquid could be delivered to the platen through any suitable means, such as through a metered tube or knife coated on a conveyer. Obviously, the precise amount of material added to the platen is critical, since the thickness of the partially cured material is directly dependent on the amount in the platen.

Figure 2:
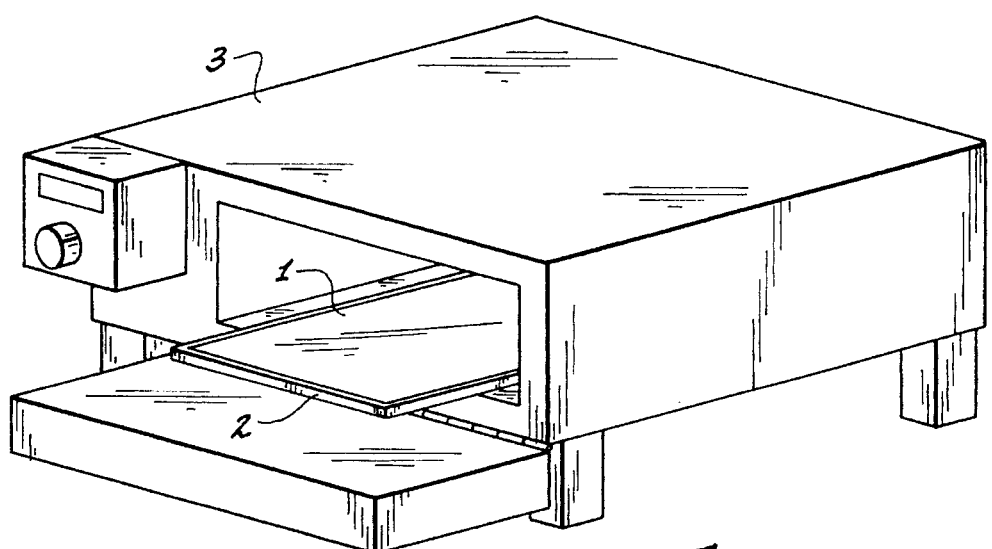
FIG. 2 illustrates one method of initially curing the polymerizable or curable composition by heating in an oven.

FIG. 2 illustrates the partial curing of the liquid polymerizable or curable composition. In one embodiment shown in FIG. 2, the composition is baked in oven 3 until the material achieves a Shore A Durometer reading of approximately 40 to about 80. At this rating, the material is soft yet resilient and is easily cut by any ordinary cutting blade. In a preferred embodiment, this hardness may be achieved after baking for approximately 250° to 300° F. for approximately 10 to 15 minutes. The higher the temperature, the less time is required for this initial curing step. It should be noted that, although an oven is depicted in the drawings, other means of heating the material are also suitable. For example, it may be desirable to heat the material by means of a heated press plate which is laid atop the platen. The press plate could be precisely positioned above the platen to ensure a uniform thickness (if too much material was in the platen, the press plate would force the excess over the sides of the platen).

Figure 3:
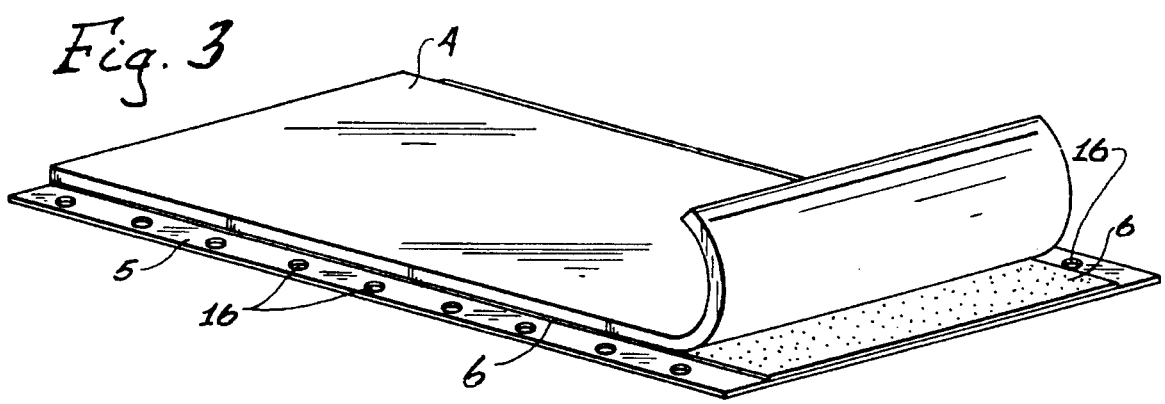
FIG. 3 illustrates the partially cured composition applied to a silicone coated paper liner.
Figure 4:
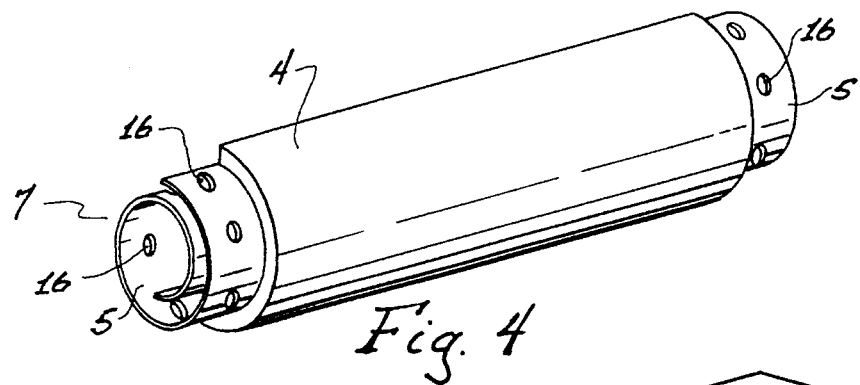
FIG. 4 illustrates a roll of the partially cured composition and liner ready for shipment to a sign shop.

Once the material is partially cured, the pliable composition 4 is secured by an adhesive 6 to a silicone release liner 5, shown in FIG. 3 as having tractor feed holes 16. The material is then formed into a roll 7, shown in FIG. 4, and is ready for shipment to a sign shop.

Figure 5:
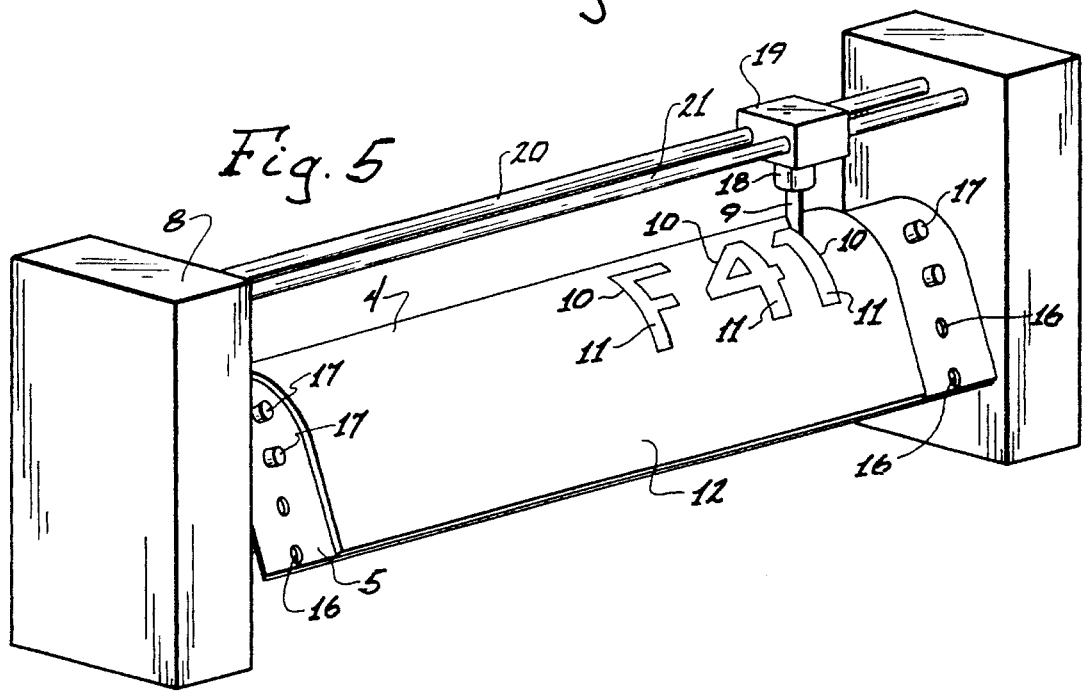
FIG. 5 illustrates part of a roll of the partially cured composition secured to a tractor feed of a computer-controlled X-Y cutter.

At the sign shop, the roll is mounted on a computer-controlled X-Y cutter 8, shown in FIG. 5. The cutter includes a tractor feed having tractor feed pegs 17 which align with tractor feed holes 16 to drive the roll on the cutter. The cutter includes cutting blade 9 mounted in housing 18. The cutting blade is retractable and rotatable. The blade housing 18 is secured to cutter housing 19 which in turn, is slidably mounted to shafts 20 and 21. The cutter housing is thus operatively arranged to move along shafts 20 and 21 as necessary, and as controlled by a computer (not shown). As shown in FIG. 5, cutting blade 9 cuts a path 10 in partially cured material 4, resulting in the formation of characters 11, shown in the figure as "F", "4" and "1".

It is to be understood that, although a letter and two numerals are shown in FIG. 5, other characters could be formed as well. It should also be understood that the three characters shown are perfectly aligned for later transfer to a sign. In other words, if a straight line were drawn transversely across the roll at the bottom of the characters, all three characters would rest perfectly on the line. Also, the vertical sections of all three characters are parallel with the edges of the partially cured material which run parallel to the tractor feed perforations. This alignment is, of course, a function of the computer control, and could be altered if desired.

After the characters are cut, the unwanted material 12 is removed or "weeded" from the release liner. This weeding process involves a simple manual removal of the unwanted material which lifts easily from the liner. The process results in only the characters remaining on the liner.

Figure 6:
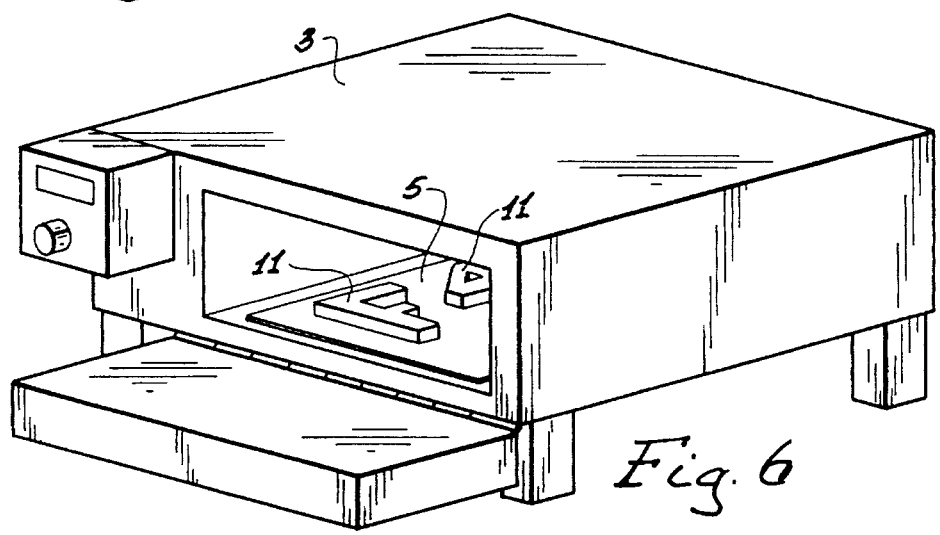
FIG. 6 shows one method of finally curing the composition in an oven after the characters have been cut therein and excess material has been removed from the liner.

FIG. 6 illustrates the final curing step. In FIG. 5, the characters are relatively soft, i.e. from about 40 to 80 on the A scale durometer. (Shore hardness 40 to 80 on the A scale.) That is, the characters are pliable and resilient and capable of being cut to the depth desired by the cutting blade. After cutting and weeding, the characters, still in place on the release liner, are placed in an oven 3, and heated until the characters harden. Typically, the characters may be heated for approximately 10 to about 30 minutes at a temperature from about 250° to about 350° F. The higher the temperature, the less time is required for final curing. In a preferred embodiment, the characters are heated until they reach a hardness of at least about 80 Shore A Durometer rating. Again, although an oven is shown as one method of effecting the final curing step, it is to be understood that other curing means are also suitable. For example, a heated press may be used.

Figure 7:
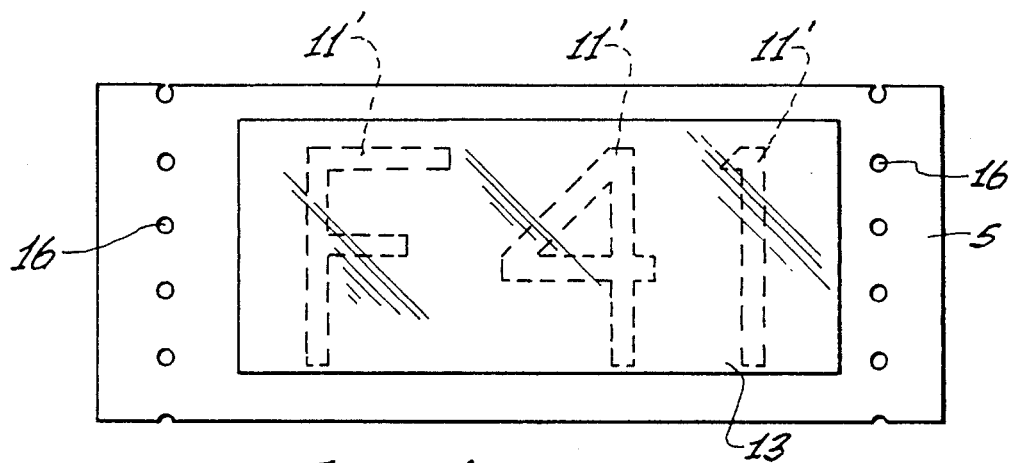
FIG. 7 illustrates the application of a transfer tape to the characters after final curing.
Figure 8:
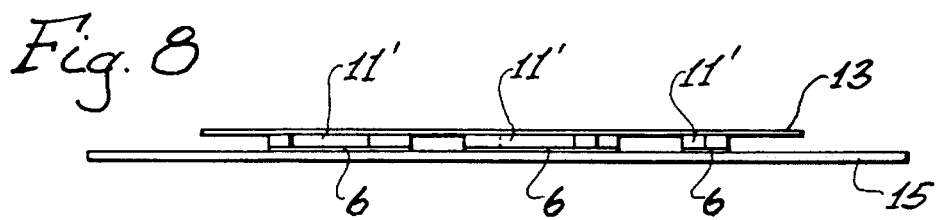
FIG. 8 is a side view of the aspect of the invention shown in FIG. 7.
Figure 9:
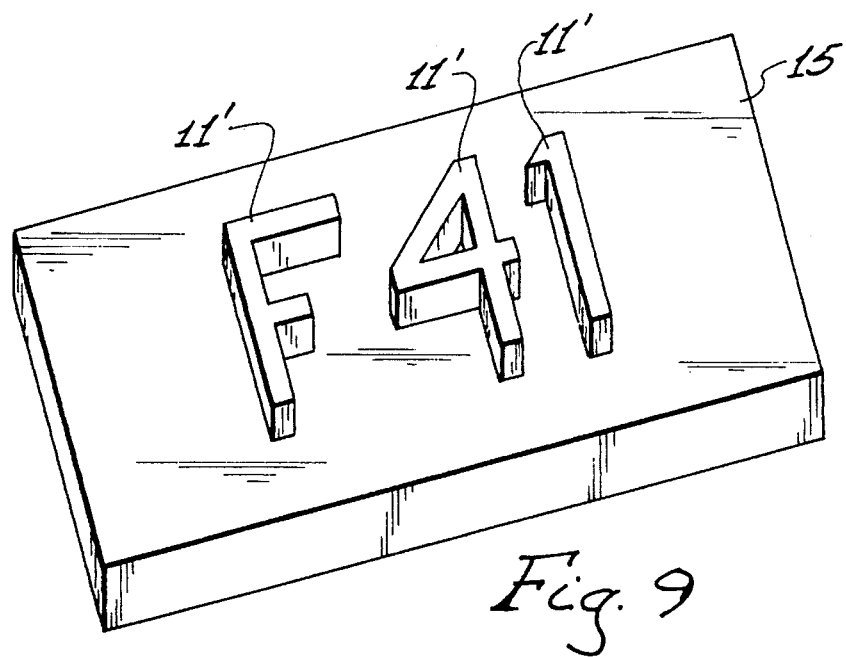
FIG. 9 is a perspective view of a finished sign made with the raised characters of the invention.

After final curing, the hardened characters 11' shown in FIG. 7 are covered by a transfer tape 13, which contains a removable low tack adhesive (not shown separately). The next step in making a sign is to simply lift all of the characters off of the release liner by means of the transfer tape. Placement of the characters on sign 15 is shown in a side view in FIG. 8. The characters are aligned on sign panel 15 and pressure is applied on the characters to form a permanent bond. Then the transfer tape 13 is removed leaving the finished sign, shown in perspective in FIG. 9.

The hardness of the fully cured products of the invention has been expressed as ratings on the Shore A Durometer, which refers to the "A scale". The highest rating on the "A scale" is 100. Products that are harder than an A scale reading of 100 are also included in this invention. Such hardnesses are generally measured on the D scale of the Shore Durometer.

Although the present invention has been described herein with a certain degree of particularity, it is to be understood that the present disclosure has been made as an exemplification of the preferred embodiment of the present invention, and the scope thereof is not considered limited by that description, but rather, is defined by what is hereinafter claimed.

What is claimed is:

1. A method of making a sign having raised characters, comprising:

machining said characters from a partially cured polymerizable composition;

removing unwanted material from said composition, leaving said characters intact;

curing said machined characters; and, transferring said machined characters to said sign.

2. A method of making a sign as recited in claim 1 wherein said partially cured polymerizable composition is secured by adhesive to a release liner, and said transferring is accomplished by securing an adhesive transfer tape to said characters, wherein the adhesion of the transfer tape is stronger than the adhesion of the release liner.

3. A method of making a sign as recited in claim 1 wherein said partially cured composition has a Shore A Durometer rating of about 40 up to 80 and said machined characters are cured to a hardness of at least a Durometer rating of greater than 80.

4. A method of making a sign as recited in claim 1 wherein said curing is accomplished by heating.

5. A method of making a sign as recited in claim 4 wherein said curing is accomplished by heating in an oven at approximately 200° F. to 350° F.

* * * * *